United States Patent
Bristow et al.

(10) Patent No.: US 7,183,777 B2
(45) Date of Patent: Feb. 27, 2007

(54) INTEGRATED CAPACITIVE SENSOR SYSTEM FOR THE MEASUREMENT OF RESISTIVITY AND DIELECTRIC CONSTANT IN GEOPHYSICAL, ENVIRONMENTAL, GROUNDWATER AND RELATED APPLICATIONS

(75) Inventors: Quentin Bristow, Ottawa (CA); Jonathan Mwenifumbo, Ottawa (CA)

(73) Assignee: Her Majesty the Queen in right of Canada, as represented by the Minister of Natural Resources, Ottawa (CA)

( * ) Notice: Subject to any disclaimer, the term of this patent is extended or adjusted under 35 U.S.C. 154(b) by 0 days.

(21) Appl. No.: 11/037,335

(22) Filed: Jan. 19, 2005

(65) Prior Publication Data

US 2006/0158199 A1 Jul. 20, 2006

(51) Int. Cl.
*G01R 27/26* (2006.01)
(52) U.S. Cl. .................................. 324/663; 324/658
(58) Field of Classification Search ............. 324/663, 324/678, 658
See application file for complete search history.

(56) References Cited

U.S. PATENT DOCUMENTS

| | | | | |
|---|---|---|---|---|
| 2,592,101 | A * | 4/1952 | Aiken | 324/355 |
| 3,973,181 | A * | 8/1976 | Calvert | 324/355 |
| 4,153,873 | A * | 5/1979 | Grindheim | 324/679 |
| 4,947,689 | A * | 8/1990 | Hochstein | 73/304 C |
| 6,098,020 | A * | 8/2000 | den Boer | 702/12 |
| 6,992,492 | B2 * | 1/2006 | Burdick et al. | 324/658 |
| 2004/0155871 | A1 * | 8/2004 | Perski et al. | 345/174 |

OTHER PUBLICATIONS

Timofeyev, Vladimir; The VCHEP-logging:, A new Step in the development of a capacitive coupled resistivity system; Moscow; Oct. 1994.

Kuras, O., Ogilvy, R.D., Beamish, D., Meldrum, P. H., and Nathanail, C.P;, Capacitive Resistivity Imaging with Towed Arrays; 2002.

Mamishev, A. V., Du, Y., Lesieutre, B. C., Zahn, M; Development and Applications of Fringing Electric Field Dielectrometry Sensors and Parameter Estimation Algorithms; Journal of Electrostatics; v. 46 p. 109-123; 1999.

Timofeev, V. M. et al, A new ground resistivity method for engineering and environmental geophysics; Proceedings of the Symposium on the Application of Geophysics to Engineering and Environmental Problems(SAGEEP); EEGS; pp. 701-715; 1994.

* cited by examiner

*Primary Examiner*—Walter Benson
(74) *Attorney, Agent, or Firm*—Jones, Tullar & Cooper, P.C.

(57) ABSTRACT

The invention relates to a capacitive sensor system for measuring environmental parameters by activating a capacitive array and causing fringe electric fields to intersect the surrounding environment. An oscillator is coupled to the capacitive array and the frequency of oscillation depends upon the capacitance of the array, which represents an environmental parameter. The sensor is suitable for measuring resistivity and dielectric constant parameters in geophysical, environmental, hydro-geological and related applications. The conductors of the capacitive array can be arranged around a perimeter for use, for example, in a borehole or the conductors can be arranged in the same plane for use, for example, beneath a raft in shallow water. In the situation where the boreholes are fluid-filled, there are economic and technical advantages in using the metal plugs (normally used to seal the probe housings at each end), as the capacitive array in galvanic contact with the fluid.

15 Claims, 10 Drawing Sheets

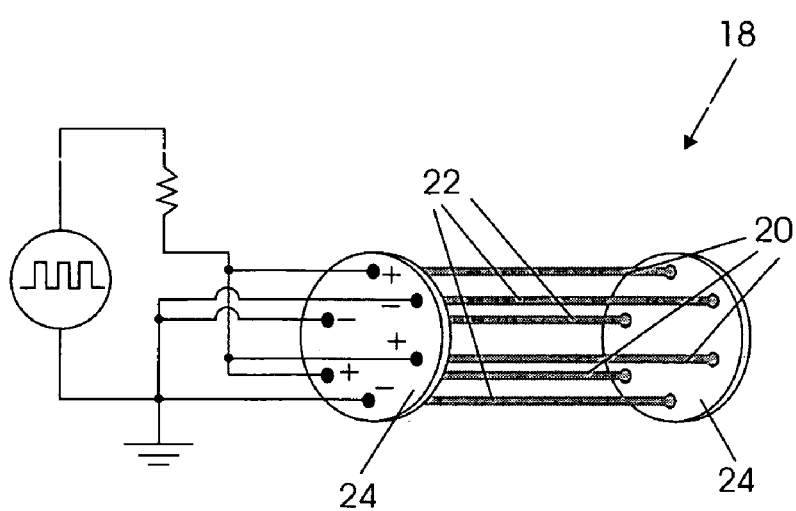
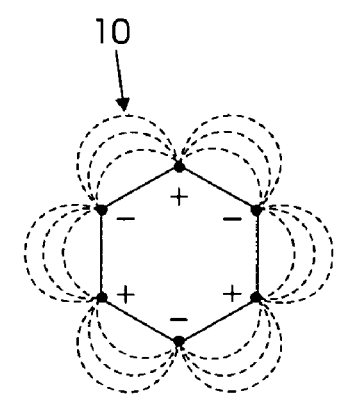
Figure 3A
Figure 3B

INTEGRATED CAPACITIVE SENSOR SYSTEM FOR THE MEASUREMENT OF RESISTIVITY AND DIELECTRIC CONSTANT IN GEOPHYSICAL, ENVIRONMENTAL, GROUNDWATER AND RELATED APPLICATIONS

FIELD OF THE INVENTION

The present invention relates to a capacitive sensor system for measuring environmental parameters in geophysical, environmental, groundwater and related applications.

BACKGROUND OF THE INVENTION

The application of geophysical electrical measurements as an oil exploration aid dates back to experiments performed by Conrad Schlumberger circa 1912 to measure variations in the resistivity of geologic formations. His legacy is the giant oil services company that bears his name.

Subsequently, these techniques were applied to mineral exploration and more recently to environmental investigations. Geophysical electrical measurements today, nearly a century after they were first made, are still focussed primarily on resistivity. Variations in this parameter yield important information in both environmental and mineral exploration applications. There are two distinct modes of operation in all cases; measurements which are made on the surface and those which are made in boreholes. In each case the simplest technique is to use two electrodes in contact with the formation and measure the potential drop when a current of known value is passed between them. A more sophisticated implementation is to use four electrodes, two for generating a current in the formation and two for measuring the potential drop across a small segment of the formation through which the current is passing. Both techniques are referred to as galvanic resistivity measurements, after Galvani, the eighteenth century Italian scientist who first investigated the electrical phenomena.

In the case of borehole galvanic resistivity measurements using four probes, one current electrode is installed at the surface, while the other current electrode and the two potential electrodes are installed in a probe that is lowered down the hole. Such measurements require good electrical contact between the electrodes in the probe and the wall of the borehole.

In several instances, particularly in hydro-geological and environmental applications, the boreholes are cased with plastic, making the use of the galvanic techniques impossible. For many years an alternate solution has made use of an inductive electromagnetic technique, commonly referred to a "EM", involving a probe having a transmitter coil and a receiver coil. The transmitter generates an alternating magnetic field that is detected by the receiver. The technique relies on the fact that currents are induced in the surrounding formation by the alternating field, and in turn the field is modified according to the resistivity of the formation. The signal detected by the receiving coil thus reflects these modifications and enables the variations in resistivity to be recorded.

More recently a technique known as capacitive measurement has been demonstrated for resistivity measurements in geophysical applications. A capacitor is essentially a device consisting of two closely spaced parallel conducting plates, separated by an electrical insulator. The insulator can be air or some other material chosen for certain desirable properties, such as high voltage breakdown or high dielectric constant.

When the plates of a capacitor are connected to an electrical oscillator circuit, an alternating electric field is generated between them. Normally this field is confined to the region between the plates, as shown in FIG. 1A. If, however, the plates are laid on a flat surface side-by-side, as in FIG. 1B, then the electric field 10 takes the form of semi-circles arching from one plate to the other on both sides like two rainbows. The dashed lines indicate lines of electric potential 12. Conductive material that intersects the extended electric field modifies its intensity. By analogy with the EM technique described above, the modification of electric field intensity can be detected by an adjacent second capacitor (the receiver capacitor).

There have been a number of papers describing both industrial and geophysical measurement systems based on the principle of dual capacitors. Parameters measured with the capacitive technique include the resistivity and dielectric constant of the material that is intersected by the electric field.

A Russian geophysicist, V. Timofeev, designed a borehole probe incorporating resistivity measurements using transmitting and receiving capacitors. FIG. 2 shows the end-to-end cylindrical configurations used by Timofeev in his borehole probe design. Two cylinders 14 form the plates of the "transmitting" capacitor in the excitation unit, while two other cylinders 16 form the plates of the "receiving" capacitor in the measurement unit.

The borehole probe was successfully demonstrated in collaboration with the GSC in 1995 and the technique has been presented at several conferences. However, subsequent attempts to create a commercially viable borehole unit from the original prototype have been unsuccessful, although a surface version of the design was more promising, see for example Timofeev, V. M. et al; *A new ground resistivity method for engineering and environmental geophysics;* Proceedings of the Symposium on the Application of Geophysics to Engineering and Environmental Problems (SAGEEP); EEGS; pp. 701–715; 1994, and has since seen commercial adoption, see for example the Geometrics OmhMapper, http://www.geometrics.com.

The primary reason for the lack of commercial interest in the borehole unit is the daunting complexity of the circuitry required to produce a detectable signal from the receiving capacitor, where the signal to noise ratio is very low. The prototype probe is also bulky and difficult to operate, requiring considerable set-up time with additional specialized electronics to perform signal conditioning at the surface.

In the field of instrumental borehole measurements for mineral exploration, boreholes come in many different varieties, depending on the purpose for which they are drilled. The diameters vary from about 2" for diamond drill holes in hard rock (very expensive to drill) to as much as 12" for environmental holes drilled to monitor environmental parameters. Some have plastic casing, while others do not. Most holes are drilled by mining companies for exploration purposes in geologic environments where the water tables are close to the surface, indicating these hole are fluid-filled. The borehole fluid is generally water with dissolved organic salts and the resistivity of the formation in this case is primarily a function of the porosity of the rocks, which determines the amount of fluid that permeates them. Other boreholes, particularly the larger diameter boreholes, are likely to be dry. Primary constraints arise from the requirement to fit a measurement apparatus into a tube of typically two inches or less in diameter and to transmit the measurement information via a cable up two kilometers to the surface. At a depth of two kilometers, the fluid pressure of water-filled holes is 3000 psi. While the size and complexity of measurement apparatus is not particularly significant for surface measurements, in the context of borehole measurements, cumbersome and costly probes are a liability. Probes can be lost by becoming wedged in a hole or destroyed due to a pressure seal failure. These problems have been a major deterrent in the adaptation of existing surface measurement capacitive resistivity systems for borehole measurements.

SUMMARY OF THE INVENTION

It is an object of the present invention to provide a novel method and apparatus for acquiring capacitive electrical measurements in geophysical, environmental, groundwater and related applications.

One aspect of the present invention relates to a capacitive sensor system for measuring environmental parameters. The sensor system includes a capacitive array. An oscillator is coupled to the capacitive array and the frequency of oscillation of the oscillator is a function of the capacitance of the capacitive array and representative of an environmental parameter. The system has an isolated power supply for the oscillator circuit.

In one capacitive array embodiment, the capacitive array comprises a plurality of parallel conductors arranged around a perimeter with alternate conductors connected to be driven by differing voltage potentials so that fringe electric fields from the capacitive array intersect the strata when the sensor is activated in the borehole. In an alternative array embodiment, the capacitive array comprises a housing, a fixed capacitor and end metal plugs that enclose the housing. One of the end metal plugs is electrically connected to a local ground of the oscillator, while another of the end metal plugs is electrically connected to the fixed capacitor.

Another aspect of the present invention relates to a capacitive sensor system comprising a planar capacitive array that has a plurality of parallel conductors arranged in the same plane. Alternate conductors are connected to be driven by differing voltage potentials. An oscillator has a frequency of oscillation that is a function of the capacitance of the capacitive array. Thus, fringe electric fields from the capacitive array intersect the surrounding environment when the planar capacitive array is activated by the oscillator. At least one resistor is included to bridge the capacitive array to the output of the oscillator. The capacitance is representative of an environmental parameter.

Another aspect of the present invention teaches an integrated capacitive sensor (ICS) system that is used to measure resistivity and dielectric constant parameters in geophysical, environmental, hydro-geological and related applications. The sensor is capable of detecting a change due to varying resistivity or dielectric constant by relying on the change in capacitance of a capacitor when a material other than air intersects the electric field generated by the capacitor. In the ICS system, a capacitor is the frequency-determining element for an oscillator driving the capacitor. The resulting digital frequency signal is received by a chip for processing. One embodiment of the basic circuit of the ICS system employs a driver (i.e. the oscillator), a resistor and a capacitor.

The present invention is simpler and less expensive than the afore-mentioned prior art. In addition, the signal of the present invention is easily transmitted up the cable to the surface.

BRIEF DESCRIPTION OF THE DRAWINGS

The following description will be better understood with reference to the drawings in which:

FIG. 3A is one embodiment of the present invention wherein the oscillator drives a capacitive array;

FIG. 3B is an end view of the capacitive array, showing the electric fields between the rods;

DESCRIPTION OF THE PREFERRED EMBODIMENTS

Figure 1A:
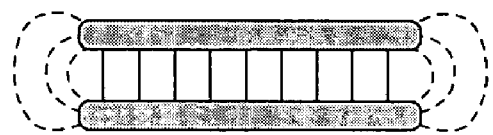
FIG. 1A illustrates the electric field pattern in a parallel plate capacitor.
Figure 1B:
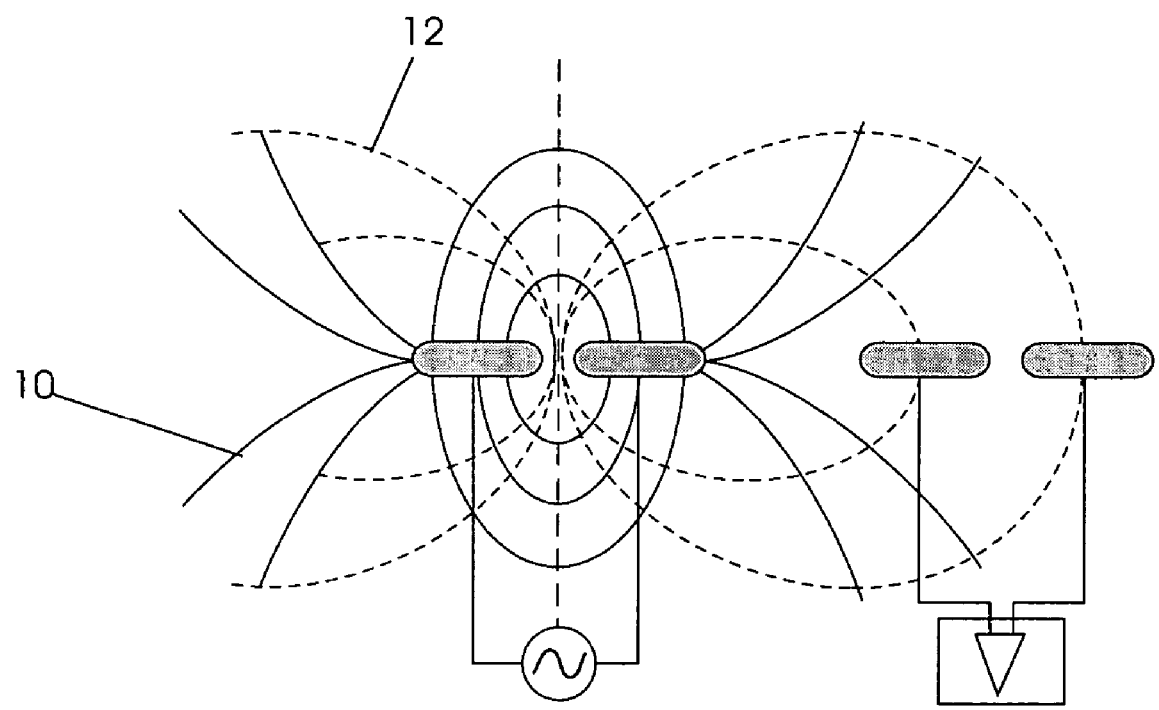
FIG. 1B illustrates the electric field pattern in a capacitor having plates arranged side-by-side.
Figure 2:
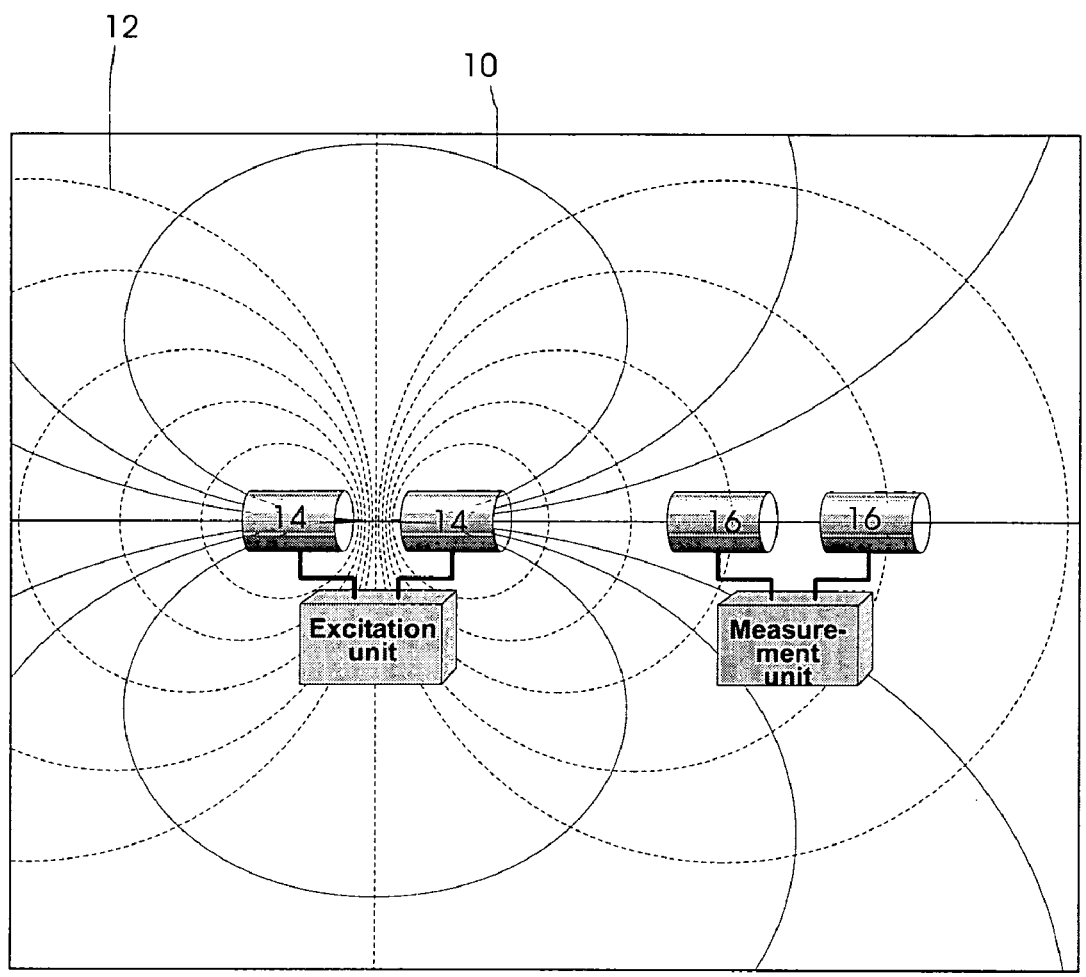
FIG. 2 is a diagram of the Timofeev borehole probe showing the extending electric fields.

The present invention uses a single capacitor to generate an electric field and to detect changes in that field due to the passage of material with varying resistivity or dielectric constant. This technique is useful for measurements in several different fields of endeavour, such as:

| | |
|---|---|
| Geophysical | exploration and mine development, both surficial and in boreholes |
| Archaeological | detection of cavities and/or objects having a significant dielectric contrast with surrounding material |
| Hydro-geological | detection of the saline markers associated with groundwater in arid climates |
| Environmental | detection of conductive contaminant plumes or monitoring in connection with the rehabilitation of contaminated sites |

The basis of the present invention stems from the fundamental physical property exhibited by a capacitor when the electric field generated by the capacitor is modified by an intersecting material, thereby altering the effective capacity. The capacitor then behaves as a variable reactive impedance, becoming a single sensor that responds to changes in electrical parameters of the environment through which it passes. The variations are detected by incorporating an Integrated Capacitor Sensor (ICS) as a frequency determining element of an electrical oscillator that, in turn, drives the ICS. The resulting frequency variations of the oscillator are then transmitted directly to a data acquisition system for conversion to resistivity or dielectric constant measurements.

The ICS involves two alternative capacitive array configurations when used in boreholes. For use in dry boreholes, an array is formed from parallel rods, wherein each pair of rods has one rod connected to the driver and the other rod connected to ground. The electric field extends outwardly and is used to measure the parameters of the surrounding borehole, such as resistivity and dielectric constant. The apparatus is encased in a composite tubular housing between metal plugs with an isolated power source. For use in fluid-filled boreholes, a second embodiment of the array benefits from the fact that the fluid is conductive and employs metal plugs to generate an electric field therebetween which takes the form of an arc with radial symmetry from one plug to the other. Direct galvanic contact with the fluid provides high efficiency coupling of the electric field to the formation. A fixed capacitor is used rather than the non-conductive probe housing to prevent a direct contact between the fluid and the internal circuitry. In both configurations an oscillator is employed to energize an RC circuit consisting of a fixed resistor and an adjacent plate or rod capacitor. Any phase shift at the output of the RC circuit is a function of the time constant that depends upon the product of the fixed resistance and the measured capacitance, which in turn is dependent upon the material that intersects the capacitive electric fields.

In the preferred embodiment for use in fluid-filled or dry boreholes, the digital frequency signal is acquired and processed by a standard PC. For borehole measurements, most conventional sensor systems generate signals that require specialized custom designed boxes at the surface to provide signal conditioning before being fed to any standard data acquisition system. In the present invention, however, the signal is a frequency that is transmitted by an industry standard line driver element for reception by a corresponding receiver chip. The system is thus compatible with off the shelf data acquisition plug-in cards that are available from a number of third party manufacturers of PC accessories, making the ICS and processing unit an inexpensive package, suitable for the budgets of environmental groups or municipalities concerned with the monitoring of contamination leaching from landfill sites or 'brown lands'.

In one embodiment of the present invention shown in FIG. 3A, an ICS probe 18 is constructed in the form of parallel rods 20, 22 arranged in a circular array and separated by circular spacers 24. Alternate rods 22 are connected to ground to form the passive or ground element of the array, while the other rods 20 are connected to the driving circuitry to form the active element. In operation, the probe is a multi-capacitive array that has radial symmetry, with the electric field 10 fringing out symmetrically into the formation, as shown in FIG. 3B. Although not shown, the probe is housed in a composite tubular housing between two metal plugs.

Figure 4:
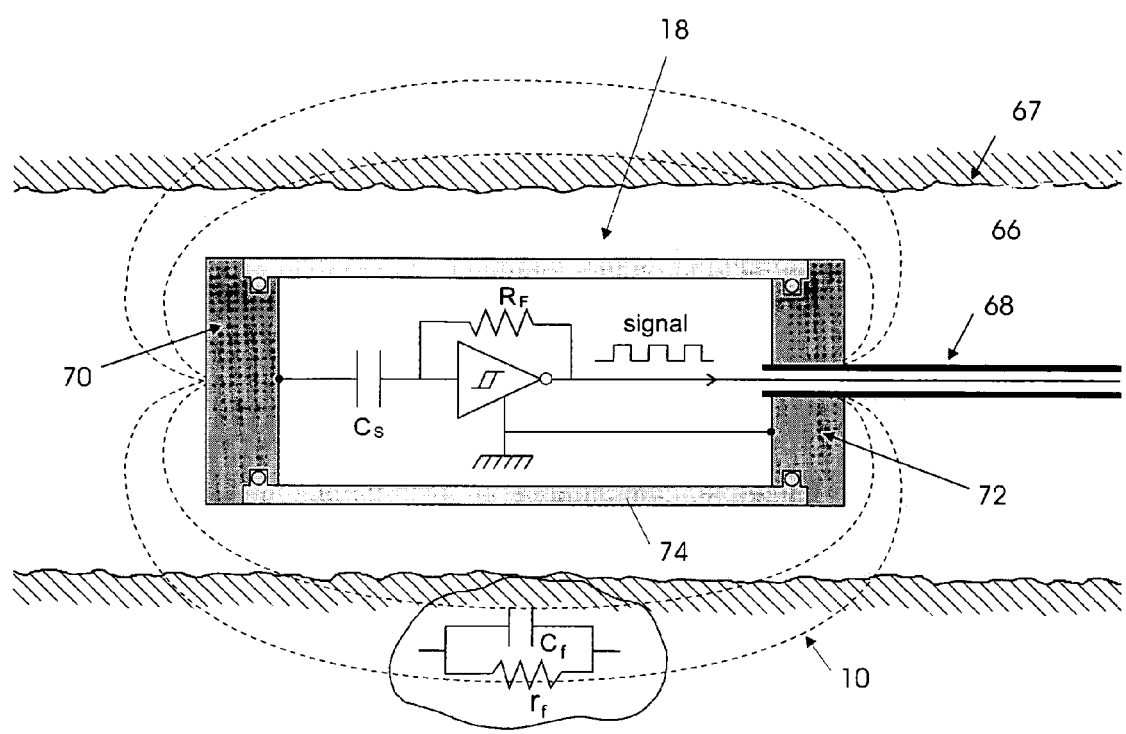
FIG. 4 is a second embodiment of the present invention wherein the oscillator drives an alternate capacitive array.

Another embodiment of the present invention is shown in FIG. 4. This embodiment is particularly advantageous when the borehole is filled with fluid 66. FIG. 4 shows the borehole wall 67 and the logging cable 68. An ICS probe 18 is constructed with the capacitor elements formed by the metal plugs 70, 72 that seal the two ends of the probe housing 74. Both metal plugs 70,72 act as electrodes in direct galvanic contact with the fluid, which provides a high efficiency coupling of the electric field 10 with the formation. One of the electrodes 72 is connected to the local ground of the oscillator circuit, while the other one 70, the active element, is connected to the driving circuitry via a fixed capacitor $C_s$. The electric field is generated as a radially symmetrical arc between the two electrodes, thereby intersecting the formation. With the electrodes in direct contact with the fluid, the electric field is coupled to the fluid and hence to the formation, forming a high efficiency configuration. The base frequency of the device is the frequency obtained when the electrodes are shorted together, and thus is determined by the value of the series capacitance and the value of the feedback resistance used in the oscillator circuit. The fixed capacitor $C_s$ performs the same function as the capacitance between the rods 20, 22 inside the non-conductive probe housing of the parallel rod array of FIG. 3A.

Both of the embodiments of FIGS. 3 and 4 preferably use an isolated power supply for the oscillator circuit. If the oscillator circuit and the associated capacitive array share a common ground with the logging cable supplying power from the surface equipment, there is a possibility that undesirable capacitive interaction between the capacitive array and the cable conductors may occur.

Figure 5A:
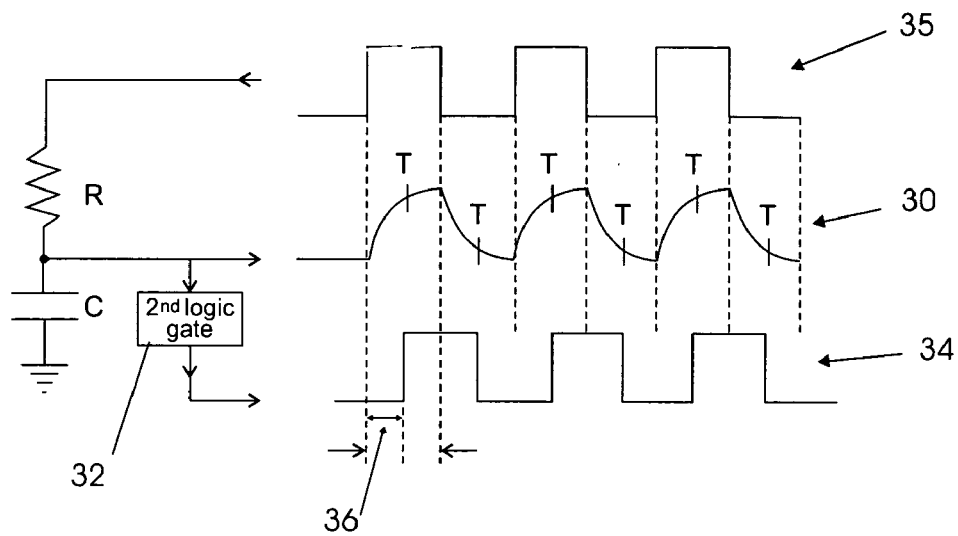
FIG. 5A is a schematic of a two-element RC network, illustrating the corresponding waveforms.

FIG. 5A shows waveforms of the ICS probe. A square wave oscillator energizes a two-element RC network consisting of a fixed resistance R and the fixed capacitance C. In this embodiment, the signal at the junction of the two elements is a degraded square wave 30 that is used as the input to a second logic gate 32, which in turn produces a second square wave 34 identical to the original 35 except for a shift in phase. "T" indicates the trigger point of the second logic gate 32. The extent of the phase shift 36 is a function of the time delay produced by the product of the R and C values.

Figure 5B:
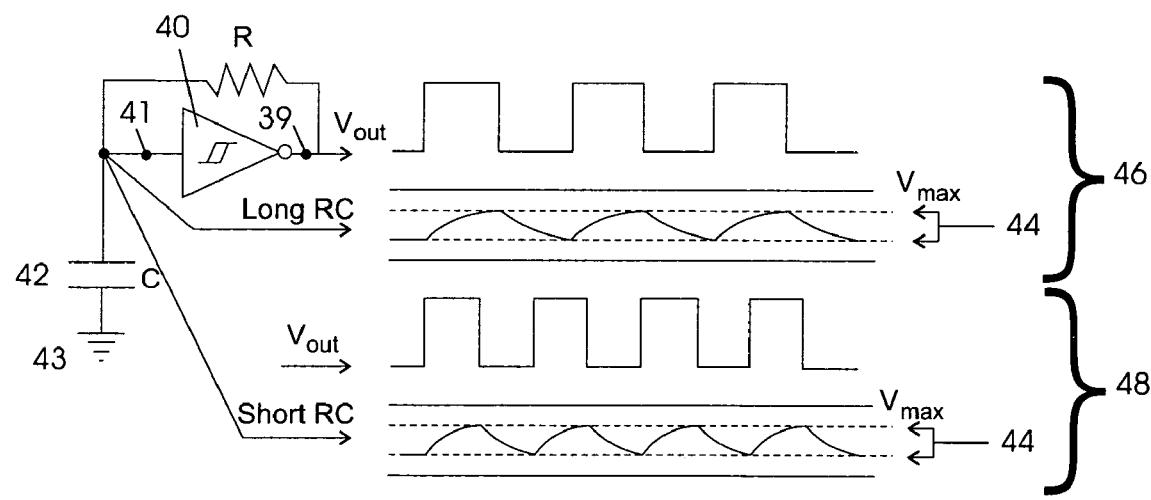
FIG. 5B is a schematic of a Schmitt-trigger oscillator, illustrating the corresponding waveforms.

In another embodiment, a Schmitt trigger oscillator is used to generate the waveforms and detect the phase shift. As shown in FIG. 5B, the resistive element R is connected between the output 39 and the input 41 of an inverting logic gate 40 having a hysteresis loop. This ensures that a change in state of the output 39 occurs only when the input 41 reaches a predetermined high-level threshold on the rising edge, and a predetermined low-level threshold on the trailing edge. Trigger levels 44 are indicated by dashed lines on the waveforms taken at the input 41. Capacitor 42 represents the fixed capacitance and is connected from the input 41 to ground 43. Changes in the impedance value cause changes in the frequency of operation of the oscillator such that a long RC time constant results in a slower output frequency, as illustrated in waveform set 46, while a short RC time constant results in a higher output frequency as per waveform set 48.

Figure 6A:
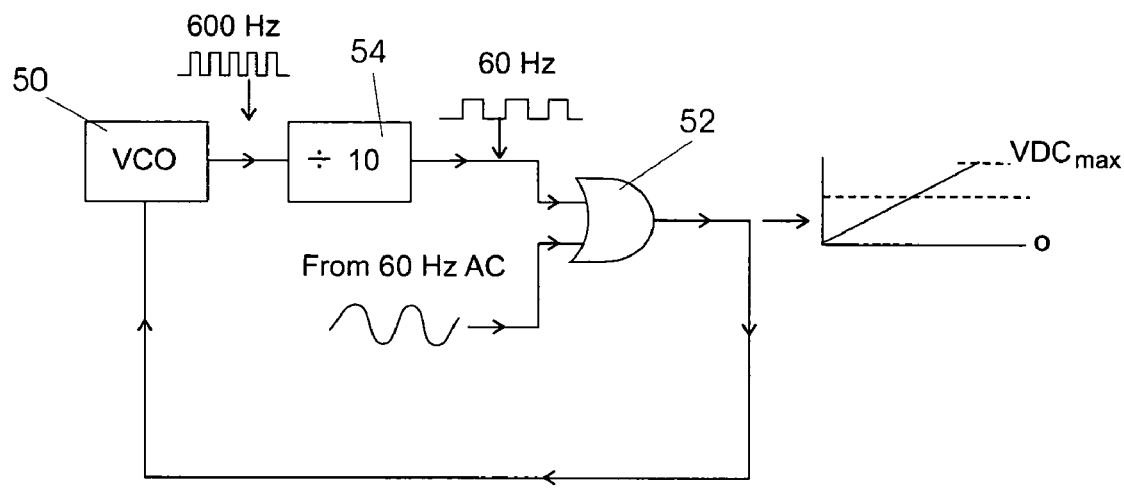
FIG. 6A is a schematic of a typical phase locked loop.

FIG. 6A shows a typical phase-locked loop (PLL) circuit. A PLL generally employs a Voltage Controlled Oscillator (VCO) 50 that is a square wave oscillator with a frequency that can be altered via a voltage level change applied to its input. A PLL circuit also employs a phase comparator 52 that has two inputs, one of which is usually the VCO output, the other being a reference waveform. The phase comparator 52 outputs a DC level that is proportional to the phase difference between its two inputs. This DC level is applied to the VCO, which alters the frequency of oscillation until the phase difference is driven to some predetermined value, usually ninety degrees. PLL circuits are available as low power single-chip integrated circuits, which are suitable for use with a borehole probe.

In the example shown in FIG. 6A, the VCO 50 generates a frequency that is an exact multiple of the 60 Hz AC supply, i.e. 600 Hz in this example. The VCO output is applied to a divide-by-ten counter chip 54 to produce an output that is approximately 60 Hz. The phase comparator 52 receives the output signal of the counter chip 54 and a low voltage signal derived from the 60 Hz AC supply. A DC level is generated at the output of the phase comparator 52 to drive the VCO frequency to be exactly 600 Hz and hence phase-lock to the 60 Hz supply. An oscilloscope display would show the two waveforms phase-locked and stationary, with ten periods of the VCO corresponding to exactly one period of the AC supply. If the AC supply frequency drifts from the value of 60 Hz for any reason, the VCO generated frequency of 600 Hz follows it precisely.

Figure 6B:
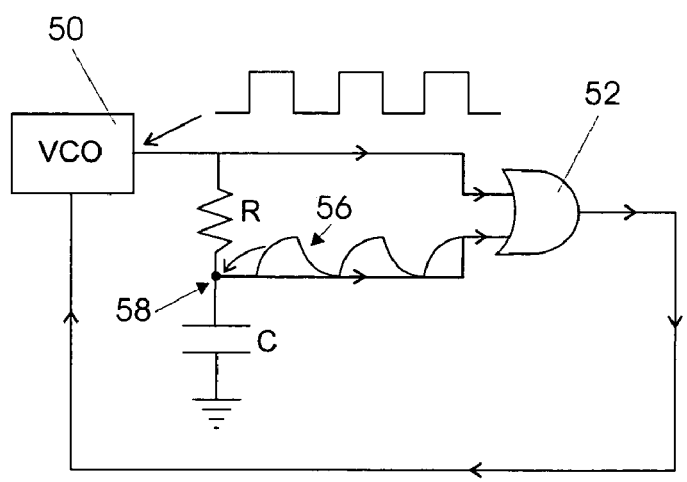
FIG. 6B is a schematic of a phase locked loop in one embodiment of the present invention.

FIG. 6B shows a PLL in an embodiment of the present invention. The VCO 50 drives the two-element RC circuit and the signal 56 at the junction 58 of the RC circuit is applied to a second logic gate (not shown) to generate a second square wave signal. The second square wave signal has the same frequency as the VCO 50, but with a phase lag that depends on the value of the RC combination. The VCO output and the output of the second logic gate are input to the phase comparator 52. If the RC product varies due to variations in electrical properties of the surrounding environment, then the phase difference seen by the phase comparator is altered and the phase comparator output has an altered DC level. This in turn alters the frequency of the VCO 50 in such a way as to restore the phase difference between the two signals. This altered DC level is the signal that represents the changing resistivity/dielectric constant parameters of the borehole formation or surrounding environment.

Probes of the embodiments of FIGS. 3 and 4 have been constructed and tested to obtain resistivity measurements in a well-documented borehole. When compared to measurements obtained by conventional electrical techniques in the same borehole, the probes were found to display excellent reproducibility and close correlation.

Borehole resistivity logs were recorded in one of six Geological Survey of Canada (GSC) test holes that were drilled in 1981 and intersect approximately 60 meters of sedimentary paleozoics overlying a crystalline basement. There is an unconformity at the interface that is characterized by altered granite basement rocks that form a highly conductive stratum. A number of geophysical parameters for these holes have been extensively documented, both by analysis of the cores and from instrumental measurements recorded using a variety of different borehole probes. For example, reference logs have been made of the resistivity using both the galvanic technique and the Timofeev capacitive probe.

Figure 7:
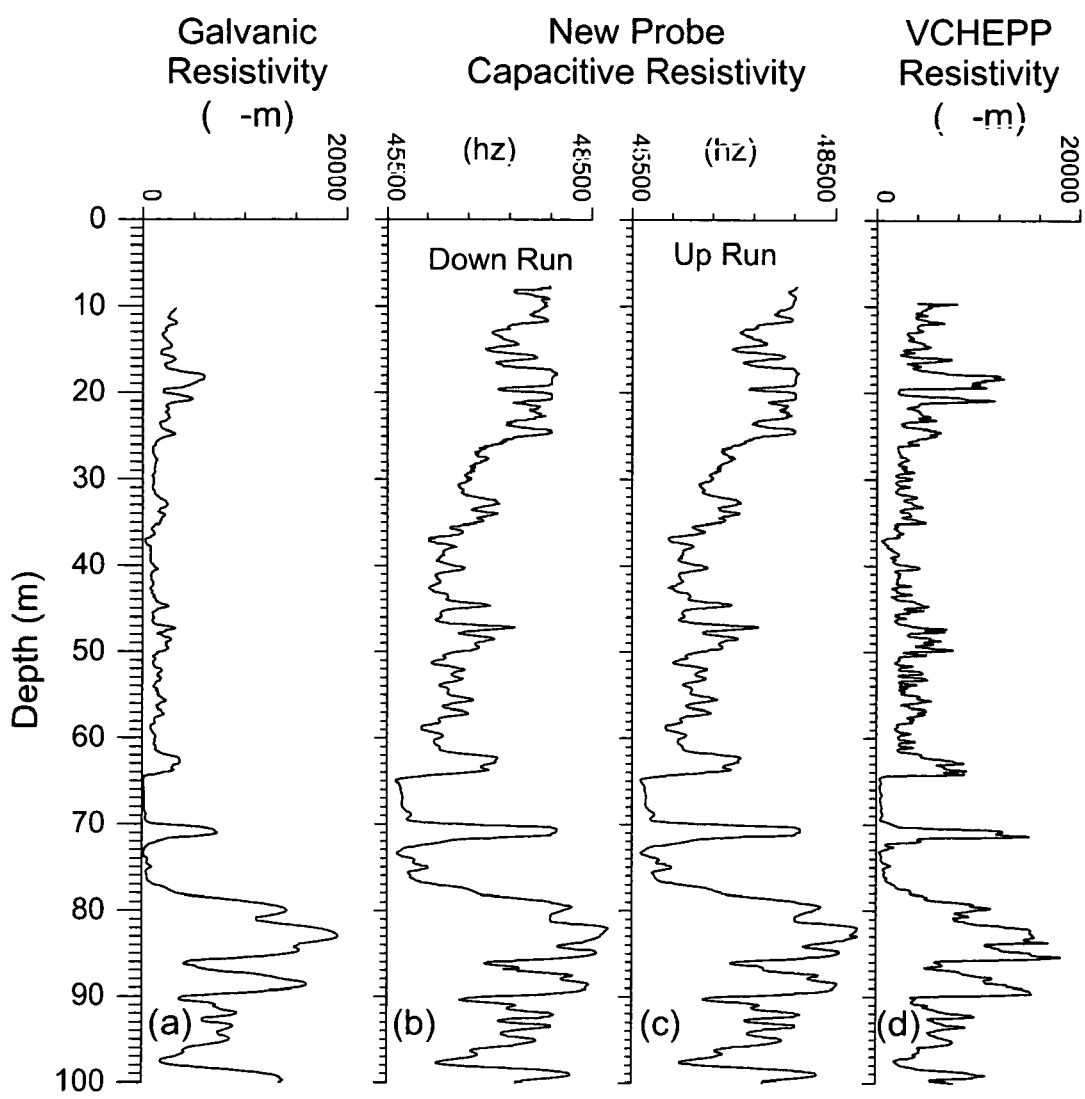
FIG. 7 is a graph comparison of electrical resistivity logs acquired in a borehole at a geophysical test site.

FIG. 7 shows borehole resistivity logs where (a) is a 40 cm normal array galvanic resistivity log; (b) is a log recorded with the fluid-filled borehole array ICS probe lowered down the hole; (c) is a log recorded with the six-rod fluid-filled borehole array ICS probe pulled up the hole; and (d) is a capacitive resistivity log recorded with the old Timofeev probe. The correlation between the ICS probe readings and the two reference logs is excellent and demonstrates the validity of the ICS technique for the measurement of formation resistivity.

Figure 8:
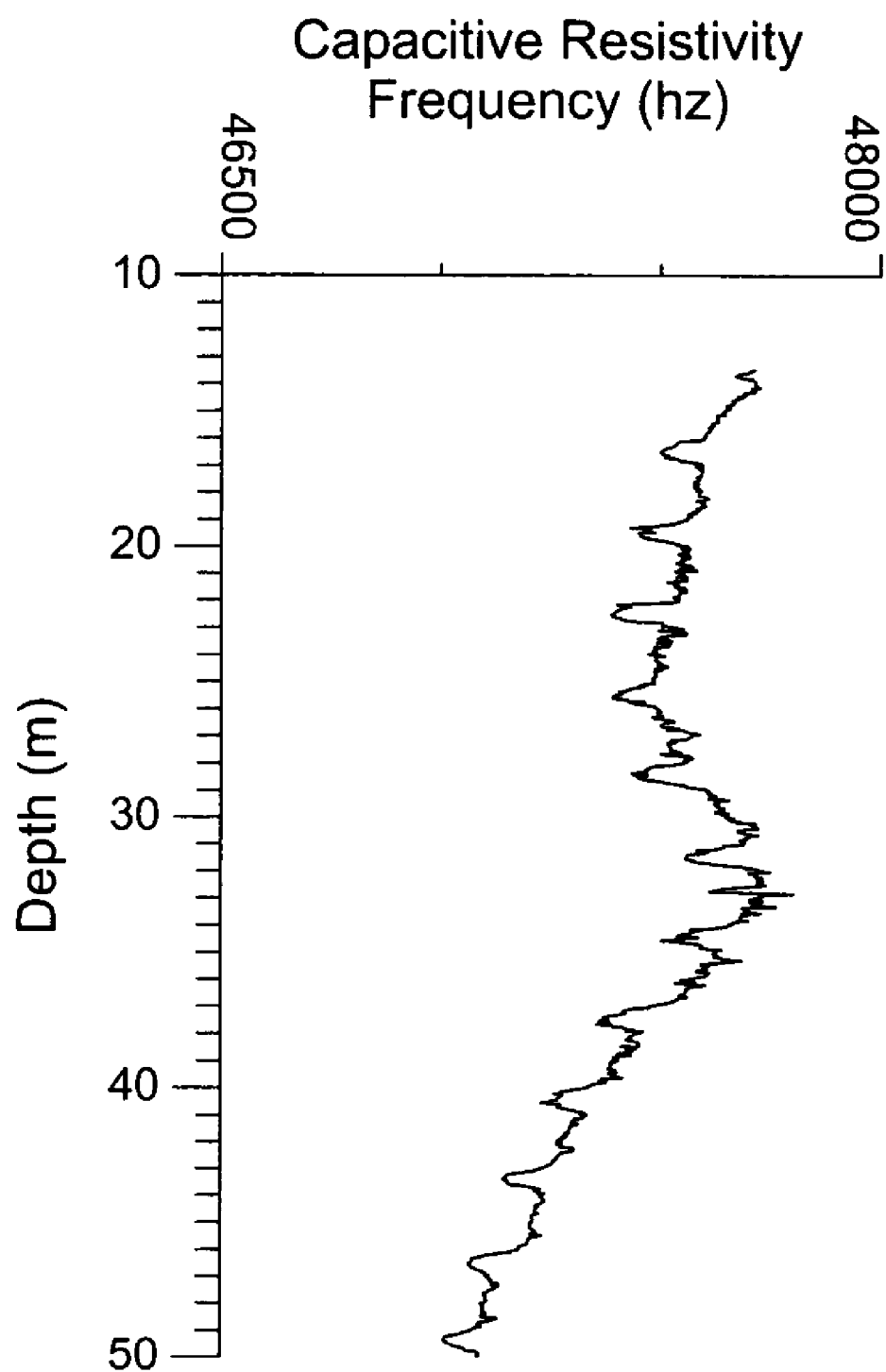
FIG. 8 is a graph of a capacitive resistivity log recorded with a probe of the present invention in a plastic-cased hole.

FIG. 8 shows a capacitive log recorded with the ICS probe in a hole drilled near a landfill site and lined with plastic casing. Each casing section is three meters long. It is notable that the joints in the plastic casing at three meter intervals are clearly visible on the log, confirming that the capacitive technique responds to changes in dielectric constant. Superimposed on this casing response is a low wavelength signal reflecting a change in formation resistivity.

Figure 9:
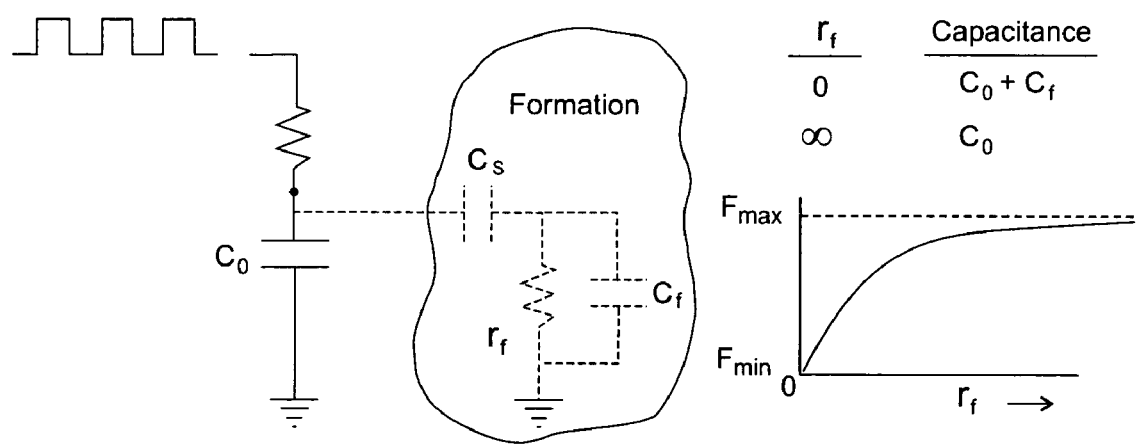
FIG. 9 is a schematic model representation of the sensor and borehole formation.

FIG. 9 is a schematic representation of the ICS probe in the borehole formation for the embodiment of FIG. 3. In both the schematic of FIG. 9 and that of FIG. 4, the formation is represented by an approximate electrical equivalence consisting of capacitive and resistive elements in parallel and denoted in both figures by $C_f$ and $R_f$. The modus operandi of the circuit is also the same for both array configurations. The fixed capacitance between the active and grounded rods is denoted by $C_0$. The distributed formation capacitance and resistance $(C_f r_f)$ combine with $C_0$ and $C_s$ to form a reactive impedance that causes frequency variations.

In practice, the resistive element dominates the response and if $C_f$ is disregarded, then a simplified analogous illustration is possible. Consider the borehole wall as a conductive sheet with the formation resistance provided by surrounding material of resistivity, $\rho$. The conductive sheet has no effect if it is not grounded. If the conductive sheet is grounded, then it represents the maximum possible formation capacitance and a value of zero for $\rho$. If the ground is moved from the conductive sheet out into the surrounding material, the material becomes equivalent to a lumped resistance of some value $R_{eq}$. When the conductive sheet is grounded and the probe is inserted into the borehole, the capacitance is at a maximum since the conductive sheet becomes an additional ground element in the array of rods. As the ground is moved out into the surrounding material or formation, the effective resistance increases and the frequency increases toward the value that is obtained in air with no conductive sheet, which is the same as with the sheet present but ungrounded.

In reality, the frequency, f, is proportional to the equivalent resistivity, $r_{eq}$. An analysis of the equivalent circuit of FIG. 9 shows that the relation is non-linear and approximates the form:

$$f = K(1 - \exp(-r_{eq}))$$

where K is an arbitrary constant. As shown in FIG. 9, an empirical calibration curve for a selected probe in a hole of a given diameter is constructed by plotting the frequency from a log made by the probe over as large a range as possible against the resistivity values obtained from a galvanic log taken in the same hole. The resulting calibration curve is then applicable to all logs taken in holes of the same diameter.

Figure 10:
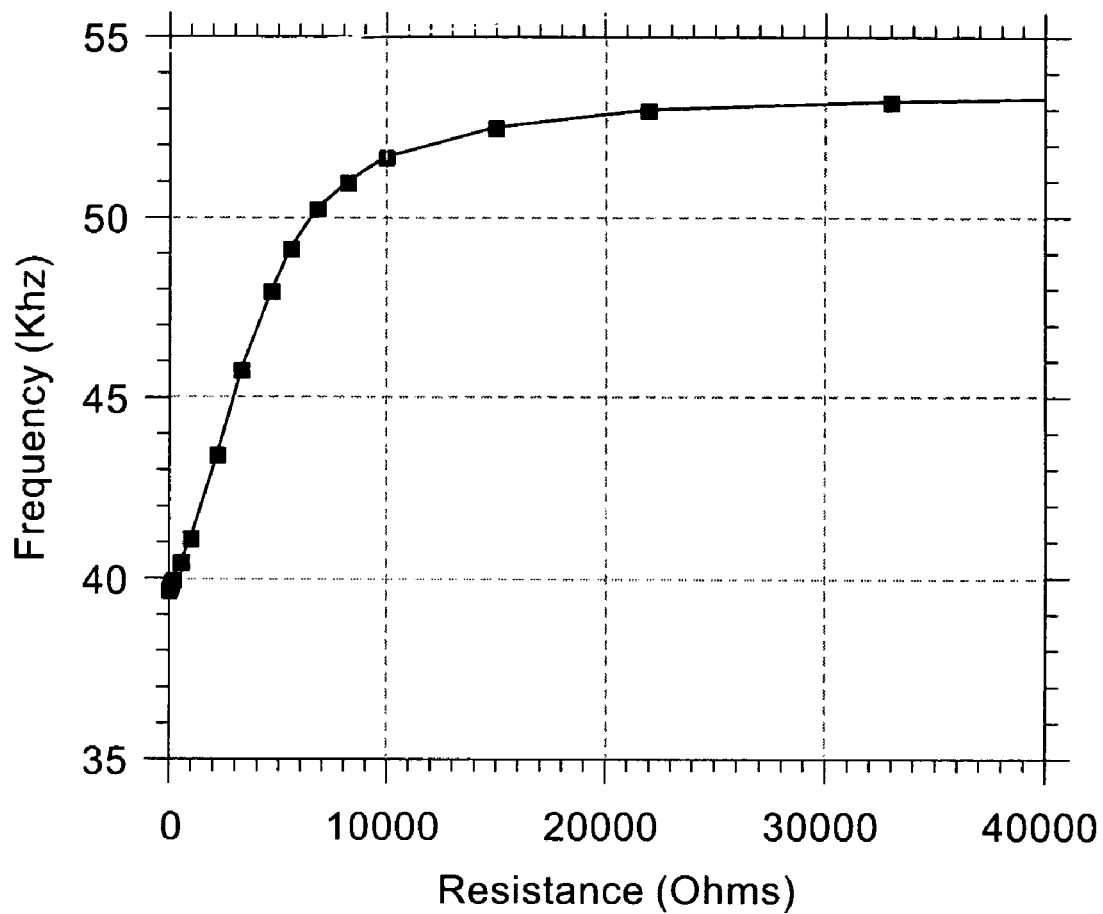
FIG. 10 is a graph of the results of frequency versus lumped resistance for a probe having six-rods.

The theory of equivalent resistance described above was validated experimentally by wrapping the shell housing (40 mm ABS pipe) of a test probe with adhesive aluminium foil to represent the smallest possible borehole diameter for this particular probe. The parallel rod array was inserted into the housing and, as expected, the frequency was not affected unless the foil was grounded, at which point the frequency dropped substantially. A selection of fixed resistor values were then inserted in turn between the ground and the foil and the frequencies were recorded for each value. FIG. 10 shows a resulting plot of frequency versus equivalent resistance for resistor values up to 33 kΩ, illustrating the exponential nature of the relationship. In practice, this shows that higher values of formation resistivity will be recorded as less than their true values due to the non-linearity of the ICS system response beyond about 8 kΩ.

The relationship between $r_{eq}$ and the actual resistivity $\rho$ can be quantified by noting that cylindrical symmetry makes this a two dimensional problem. Considering a constant current $I_o$ generating a potential drop $V_{ab}$ between the conductive sheet at the borehole wall of radius a and another virtual cylinder in the formation of radius b, which is the effective limit of the penetration of the electric field generated by the probe and is thus the effective radius of investigation. The surface current density J at the borehole wall is given per unit length by:

$$J_a = \frac{I_o}{2\pi a} \quad (1)$$

The current density at a surface at some intermediate radius r between a and b is then:

$$J_r = \frac{I_o}{2\pi r} \quad (2)$$

The potential drop $\delta v$ between r and (r+$\delta$r) is then:

$$\delta v = \frac{\rho I_o \delta r}{2\pi r} \quad (3)$$

The total potential drop from a to b is then given by:

$$V_{ab} = \frac{\rho I_o}{2\pi r} dr = \ln\left(\frac{b}{a}\right)\frac{\rho I_o}{2\pi} \quad (4)$$

The equivalent resistance $R_{ab}$ is by definition $V_{ab}/I_o$, which from (4) means that:

$$R_{ab} = \ln\left(\frac{b}{a}\right)\left(\frac{\rho}{2\pi}\right) \quad (5)$$

Or, conversely:

$$b = ae^{\left(\frac{2\pi R_{ab}}{\rho}\right)} \quad (6)$$

If the relationship between true resistivity and frequency has been established using the empirical procedure described previously, then the effective radius of investigation 'b' can be estimated. This is done by pairing values of equivalent resistance $r_{eq}$ taken from an experimental curve as in FIG. 9, with values of $\rho$ for corresponding frequencies obtained in an empirical calibration against a galvanic log as described above. By substituting the values of $R_{ab}/\rho$ into equation (6), a regression line can then be applied to determine the best-fit value of 'b', the radius of investigation. If $\rho$ is specified in ohm-meters, then 'a' and 'b' are specified in meters.

In previously known measurement techniques, such as galvanic electrodes, receiving and transmitting coils and dual capacitors, physical separation of the excitation and measurement units imposes a distortion on the measurement. This distortion is always evident in the response of the system to a very thin vein or seam of material that contrasts with the remainder of the material. Rather than recording a single spike corresponding to the thin vein, the system records a double event as the thin vein is encountered first by one system element and then by the other.

The ICS system is robust with minimal measurement distortion. The system records a single spike corresponding to a vein without recording a double spike. In addition, the system is simple to manufacture and requires minimal electronics. The borehole probe that was used to generate the test data employed parts and materials commonly found in a hardware store. For example, the electronics of one of the probes consists of only four 1970's vintage CMOS integrated circuit logic elements mounted on a small circuit board, yet producing results comparable with much more expensive and sophisticated probe assemblies.

The capability of the capacitive technique to respond to variations in dielectric constant makes it inherently a remote sensor for certain kinds of plastics, which could include plastic explosives such as land mines. A different configuration of the capacitive array is required for this application. Instead of the cylindrical squirrel-cage array used for the borehole measurements, a planar version is employed. Tests of such an arrangement have shown that objects such as 5 mm plastic polycarbonate sheets placed in proximity to the array are clearly detected, similar to the test illustrated in FIG. 8 that clearly shows the casing joints every three meters. As an example of this use, a planar array version of the ICS mounted beneath a raft could be used to detect land mines sown in rice paddy fields in shallow water. In that case the contrast between the dielectric constant of water (80) and that of the plastic explosives (less than 2), enhances the detection capability, while the water environment has a fairly uniform resistivity, generating minimal interference in the signal.

The present invention, due to its basic simplicity, is well suited to large-scale production. It has wide applications in fields such as mineral exploration, groundwater investigations and environmental monitoring. The technique of capacitive resistivity measurement has not been previously viable for borehole applications due to the cost and complexity of the equipment required, a problem which the ICS system addresses. The technique of the present invention is clearly applicable to both surficial and borehole measurements.

Variations in the system will be appreciated by one skilled in the art. For example, the metal end caps can be recessed into the housing.

What is claimed is:

1. A capacitive sensor system housed in a sealed tubular pressure-proof housing for the characterization of the geological properties of material intersected by boreholes, comprising:
   a capacitive array;
   an oscillator coupled to the capacitive array and having a frequency of oscillation that is a function of the resistivity and dielectric constant of the material intersected by the electric field generated by the capacitive array; and
   wherein the capacitive array comprises a plurality of parallel conductors arranged around a perimeter with alternate conductors connected to be driven by differing voltage potentials so that fringe electric fields from the capacitive array intersect the material when the sensor is activated in the borehole.

2. The capacitive sensor system of claim 1 wherein the capacitive array has an even number of parallel conductors so that the fringe electric field is radially symmetrical.

3. The capacitive sensor system of claim 1 wherein the oscillator is a Schmitt-trigger oscillator having an inverting logic gate that has an output and an input, the capacitive array connected between the input and ground, the sensor system further comprising a resistor connected between the output and the input of the inverting logic gate.

4. The capacitive sensor system of claim 1 further comprising at least one resistor bridging the capacitive array to the oscillator, and logic means connected at a junction between the resistor and the capacitive array for producing a square wave from a signal at the junction.

5. The capacitive sensor system of claim 4 wherein the oscillator is a VCO and the system further comprises a phase comparator that receives an output of the VCO as a first input and an output of the logic means as a second input, the phase comparator having an output that is input to the VCO.

6. The capacitive sensor system of claim 4 further comprising means for recording the frequency and probe depth using a standard personal computer installed at ground surface.

7. The capacitive sensor system of claim 1 for use in one of the applications selected from the group consisting of geophysical applications for exploration and mine development, archaeological applications for the detection of cavities or objects that have a significant dielectric contrast with surrounding material, and applications involving the detection of conductive contaminants.

8. A capacitive sensor system housed in a sealed tubular pressure-proof housing for the characterization of the geological properties of material intersected by boreholes, comprising:
a capacitive array;
an oscillator coupled to the capacitive array and having a frequency of oscillation that is a function of the resistivity and dielectric constant of the material intersected by the electric field generated by the capacitive array;
wherein the capacitive array comprises a fixed capacitor; and
end metal plugs enclosing the housing, one of the end metal plugs being electrically connected to a local ground of the oscillator and another of the end metal plugs being electrically connected to the fixed capacitor.

9. The capacitive sensor system of claim 8 wherein the oscillator is a Schmitt-trigger oscillator having an inverting logic gate that has an output and an input, the capacitive array connected between the input and ground, the sensor system further comprising a resistor connected between the output and the input of the inverting logic gate.

10. The capacitive sensor system of claim 8 further comprising at least one resistor bridging the capacitive array to the oscillator, and logic means connected at a junction between the resistor and the capacitive array for producing a square wave from a signal at the junction.

11. The capacitive sensor system of claim 10 wherein the oscillator is a VCO and the system further comprises a phase comparator that receives an output of the VCO as a first input and an output of the logic means as a second input, the phase comparator having an output that is input to the VCO.

12. The capacitive sensor system of claim 10 further comprising means for recording the frequency and probe depth using a standard personal computer installed at ground surface.

13. The capacitive sensor system of claim 8 for use in one of the applications selected from the group consisting of geophysical applications for exploration and mine development, archaeological applications for the detection of cavities or objects that have a significant dielectric contrast with surrounding material and applications involving the detection of conductive contaminants.

14. A capacitive sensor system, comprising:
a planar capacitive array having a plurality of parallel conductors arranged in the same plane, alternate conductors connected to be driven by differing voltage potentials;
an oscillator having a frequency of oscillation that is a function of the capacitance of the capacitive array so that fringe electric fields from the capacitive array intersect the surrounding environment when the planar capacitive array is activated by the oscillator;
at least one resistor bridging the capacitive array to the output of the oscillator; and
an isolated power supply for the oscillator circuit;
wherein the capacitance is representative of an environmental parameter.

15. The capacitive sensor system of claim 14 wherein the environmental parameter is selected from the group consisting of resistivity, dielectric constant and a combination thereof and the system further comprises a wide range of base frequencies to optimise the sensitivity of the system for the measurement of either resistivity or dielectric constant.

* * * * *